Aug. 9, 1927.   A. E. SMALL   1,638,019
ATTACHING MEANS FOR LOAD LIFTING DEVICES
Filed March 17, 1926
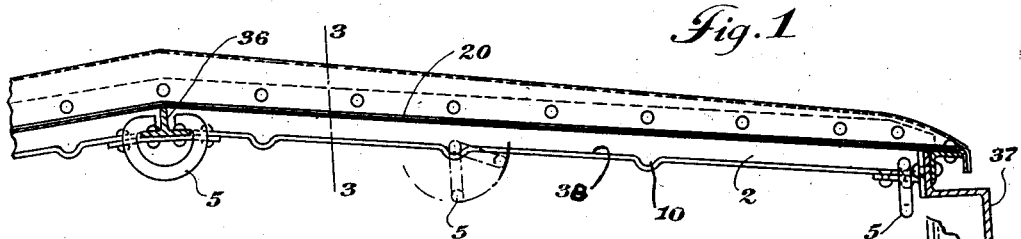
Fig. 1
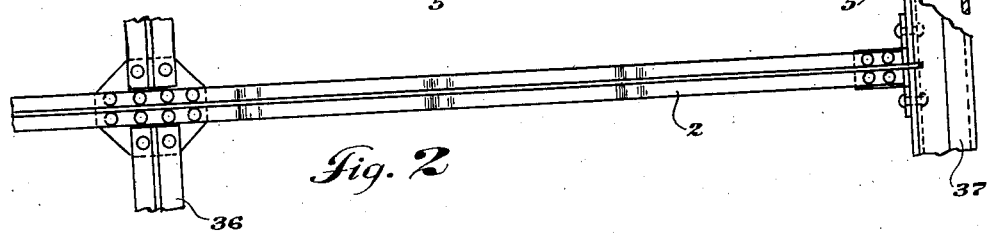
Fig. 2
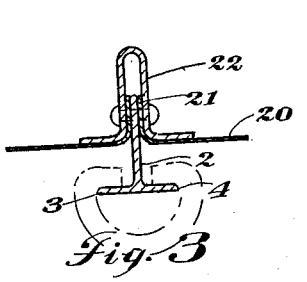
Fig. 3
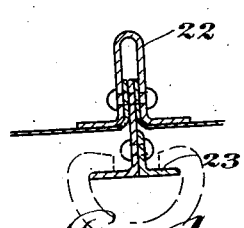
Fig. 4
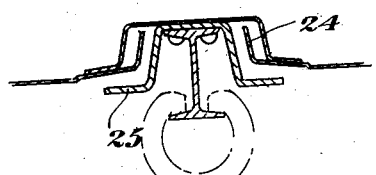
Fig. 5
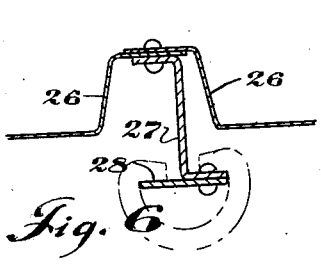
Fig. 6
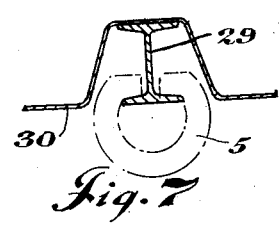
Fig. 7
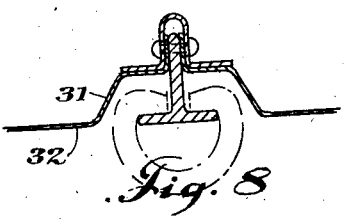
Fig. 8
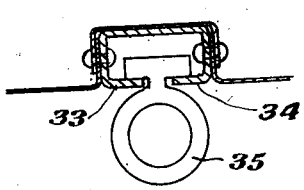
Fig. 9
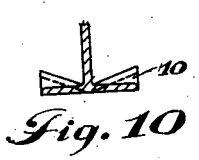
Fig. 10
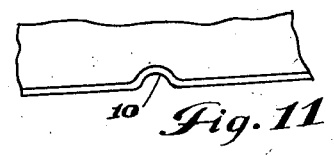
Fig. 11
Fig. 12
Fig. 13
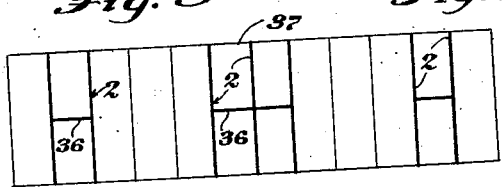
Fig. 14
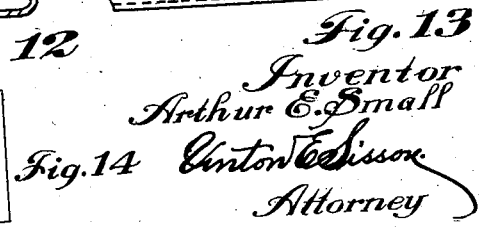
Inventor
Arthur E. Small
Clinton E. Sisson
Attorney Patented Aug. 9, 1927.

1,638,019

UNITED STATES PATENT OFFICE.

ARTHUR E. SMALL, OF OAK PARK, ILLINOIS.

ATTACHING MEANS FOR LOAD-LIFTING DEVICES.

Application filed March 17, 1926. Serial No. 95,422.

My device relates to railway box cars and consists in providing means for moving heavy loads in and out of the car and moving them to desired positions within the car.

It is common practice to throw a rope or chain over one of the carlines or purlins of a box car to raise the lading but the ordinary roof frame of a car is not designed to resist the stress imposed thereby, thus frequently causing distorted and leaky roofs.

One of the objects of the invention is to form one or more frame members of the roof of a car to accommodate movable load lifting devices.

Another object of the invention is to so attach load lifting devices to the roof frame members of a car that they are movable to any desired position in the car, and another object is to provide means to temporarily restrict the movement of such devices longitudinally of the beams to which they are attached.

Another object is to so attach load lifting devices to the roof frame members of a car that the movement of the car in service will move them toward the side of the car and out of the way.

Another object of the invention is to reinforce certain parts of existing designs of car roofs to enable them to sustain stresses caused by load lifting.

My device may also be advantageously used for loading automobiles one over the other, commonly called double decking, and it may also be used to raise the upper deck in stock cars or to raise the front end of ice bunks in refrigerator cars or to raise the temporary flooring in fruit cars, etc.

In the drawings:

Fig. 1 shows a typical railway car with a form of my device applied thereto.

Fig. 2 is a plan view of Fig. 1 with the roof sheets and lifting rings omitted.

Fig. 3 is a section on line 3—3 of Fig. 1.

Figs. 4, 5, and 6 show modified constructions.

Figs. 7, 8 and 9 show modified constructions wherein the bottom of the frame member is flush with the lower surface of the roof.

Figs. 10, 11, 12 and 13 show means in the frame member to temporarily restrict the movement of the lifting ring.

Fig. 14 is a skeleton plan of a roof frame of a railway box car wherein a typical arrangement of frame members equipped with my device is shown in heavy lines.

A frame member 2 is provided with oppositely disposed flanges 3—4 or portions which constitute seats or bearing surfaces for the lifting rings 5. These rings loosely encircle the oppositely projecting flanges so that they may be moved longitudinally of the frame member to any desired location. The frame members may extend longitudinally or laterally of the car or the car may be equipped with a combination of both such frame members. A frame member may be used to reinforce a carline or ridge beam, as shown in Figs. 3, 4 and 5, or it may be used to perform the functions of a carline or ridge beam independent of any other structure, as shown in Fig. 6, or it may be used independently of the roof and its framing structure, as illustrated in Fig. 7, wherein it is placed between the carlines of the car. The reinforcement for the carlines may be secured to the side plates 37 if desired and the longitudinal frame members 36 may be secured to the lateral frame members, as shown in Figs. 1 and 2.

One or more lifting rings may be used on each frame member as desired.

If a diagonal or horizontal pull be exerted on one of these rings it may slip longitudinally of the beam, therefore, I provide means to temporarily restrict such longitudinal movement. This may be accomplished by pressing indentations 10 (either upwardly or downwardly) in one or both of the oppositely disposed flanges, or one or both of the oppositely disposed portions may be formed with an upturned flange 11 having notches therein 12.

In the construction shown in Fig. 3 the roof sheets 20 have upturned flanges 21 which are straddled by the carline-cap 22 and the frame member 2 is used to reinforce the carline-cap. It is not necessary to reinforce all of the carline-caps in a car because it is not desirable to locate load lifting devices at each and every carline.

The construction shown in Fig. 4 is similar to that shown in Fig. 3 except that a flanged plate with an angle 23 riveted to it is used in place of the T section.

In Fig. 5 the upturned flanges 24 of the roof sheets are spaced apart from the carline 25 (or purline) and a cap is used for weather-proofing. The frame member reinforces the carline (or purline).

In the construction shown in Fig. 6 the roof sheets have L-shaped flanges 26 which are secured together to form an inverted U-section which performs the functions of a carline (or purline). A Z-shaped frame member 27 is secured to the inverted U-section and a flat plate 28 is secured to its lower edge of the Z-section to provide the oppositely disposed portions.

Fig. 7 shows a construction wherein the frame member 29 is positioned independently of the juncture of adjacent roof sheets. The bottom of the frame member is flush with the lower surface of the roof 30 and the roof sheet is spaced from the oppositely disposed portions to permit movement of the lifting ring.

The construction shown in Fig. 8 is similar to that shown in Fig. 3, but the roof sheets are offset (31) so that the lower portion of the frame member will be flush with the lower surface of the roof 32.

In the construction shown in Fig. 9 the oppositely disposed flanges 33—34 project toward each other instead of away from each other, as shown in the other figures. This, however, is immaterial to the invention. Such a construction may require a T head loading device 35 instead of a ring, as shown in the other drawings.

Figs. 10 and 11 show how indentations 10 may be formed in either one of the flanges to temporarily restrict the movement of the ring longitudinally of the frame member. Figs. 12 and 13 show how this result may be accomplished by providing upturned flanges 11 at the outer edge of one or both of the oppositely projecting flanges and providing notches 12 therein to accommodate the rings.

It may be desirable to reinforce all of the carlines (or purlines) in a car or it may be necessary to reinforce only a part of them. The most desirable arrangement is to reinforce three or four carlines adjacent the doorways of the car so that a rope may be secured thereto to drag the lading into the car. The ridge pole may be reinforced (36) between two adjacent carlines somewhere between the middle and the end of the car so as to drag the lading part way down the car. Then one or more of the carlines at the end of the car should be reinforced so as to spot the loading where desired near the end of the car. It is good practice to load heavy ladings directly over the truck for obvious reasons. The remaining frame members, including the carlines, may be of the usual construction.

When the rings are not in use the constant motion of the car will cause them to slide down the inclined surface 38 of the flanges on the crosswise frame members until they reach the side plate of the car. In such a position they will not interfere with the interior loading capacity of the car. When it is desired to load the car to the ridge pole with light packages the rings on the longitudinal beams may be easily moved out of the way.

I claim:

1. In a railway car, the combination of a roof, a roof frame member having oppositely disposed portions flush with the lower surface of said roof, and a ring loosely suspended from said portions so as to be capable of movement longitudinally of the frame member.

2. In a railway car, the combination of a roof, a roof frame member having oppositely disposed portions, a ring loosely suspended from said portions so as to be capable of movement longitudinally of the frame member, and means to temporarily restrict said longitudinal movement.

3. In a railway car, the combination of a roof, a roof frame member having oppositely disposed portions flush with the lower surface of said roof, a ring loosely suspended from said portions so as to be capable of movement longitudinally of the frame member, and means to temporarily restrict said longitudinal movement.

4. In a railway car, the combination of a roof, a roof frame member having oppositely disposed portions, a ring loosely suspended from said portions so as to be capable of movement longitudinally of the frame member, and indentations in said portions to temporarily restrict said longitudinal movement.

5. In a railway car, the combination of a roof, a roof frame member having oppositely disposed portions, and a ring loosely suspended from said portions so as to be capable of movement longitudinally of the frame member, one of said portions having an upturned flange which is notched to provide means to temporarily restrict said longitudinal movement.

6. In a railway car, the combination of two frame members spanning the distance between the side plates of the car, a frame member spanning the distance between the first mentioned frame members and secured thereto, each of said frame members having oppositely disposed portions, and rings loosely suspended from said portions so as to be capable of movement longitudinally of the frame member.

7. In a railway car, the combination of two frame members spanning the distance between the side plates of the car, a frame member spanning the distance between the first mentioned frame members and secured thereto, each of said frame members having oppositely disposed portions, rings loosely suspended from said portions so as to be capable of movement longitudinally of the frame member, and means to temporarily restrict said longitudinal movement.

8. In a railway car, the combination of a frame member extending from side plate to side plate of the car having oppositely disposed portions which are higher adjacent the middle of the member than at the ends thereof, and rings loosely suspended from said portions, whereby the motion of the car in service causes the rings to move toward the side of the car.

9. In a railway car, the combination of a roof, a roof carline, a carline reinforcement below the carline and secured thereto, said reinforcement having oppositely disposed flanges, and a ring projecting below said reinforcement loosely engaging said flanges so as to be capable of movement longitudinally of the reinforcement.

10. In a railway car, the combination of a roof, a roof carline, a carline reinforcement below the carline and secured thereto, said reinforcement having oppositely disposed flanges, a ring projecting below said reinforcement loosely engaging said flanges so as to be capable of movement longitudinally of the reinforcement, and indentations in said flanges to temporarily restrict said longitudinal movement.

11. In a railway car, the combination of a roof, a roof carline, a carline reinforcement below the carline and secured thereto, said reinforcement having oppositely disposed flanges, a ring projecting below said reinforcement loosely engaging said flanges so as to be capable of movement longitudinally of the reinforcement and means to temporarily restrict said longitudinal movement.

ARTHUR E. SMALL.